H. W. JACOBS.
FLANGING PRESS.
APPLICATION FILED MAY 31, 1910.
972,195.
Patented Oct. 11, 1910.
5 SHEETS—SHEET 1.
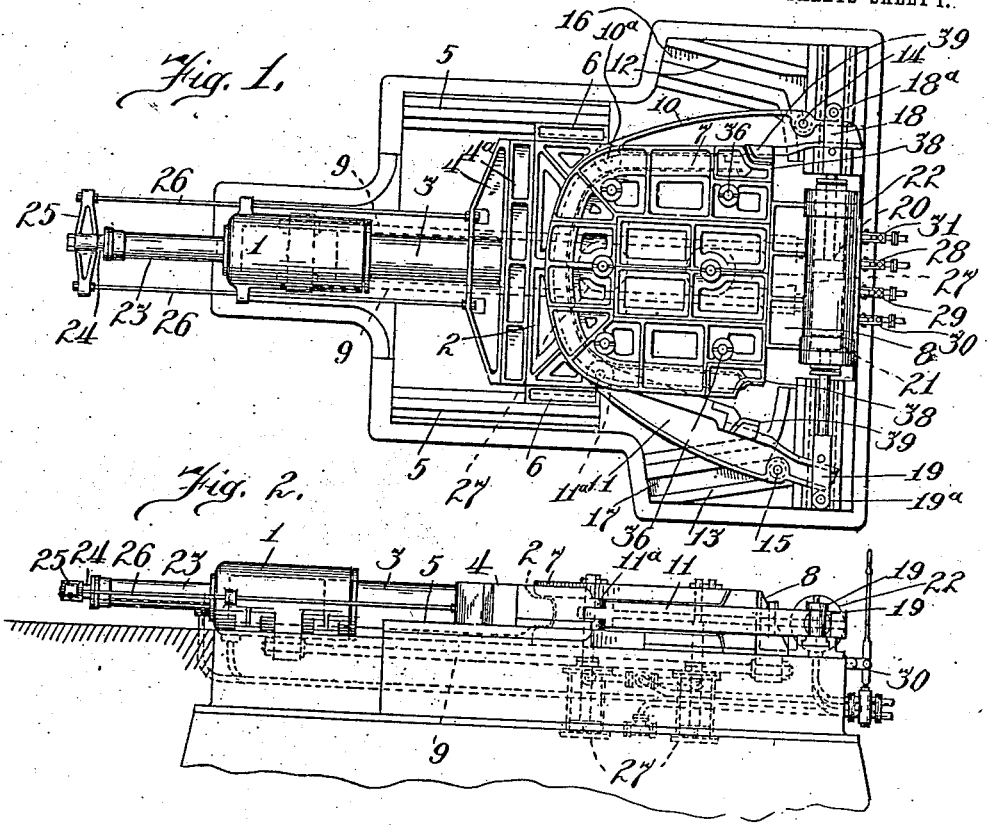
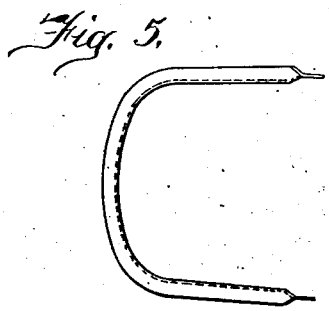
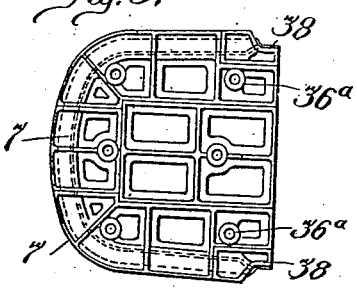
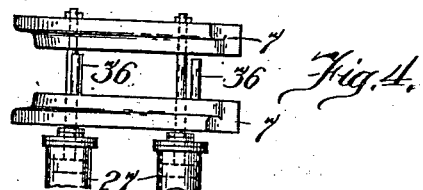

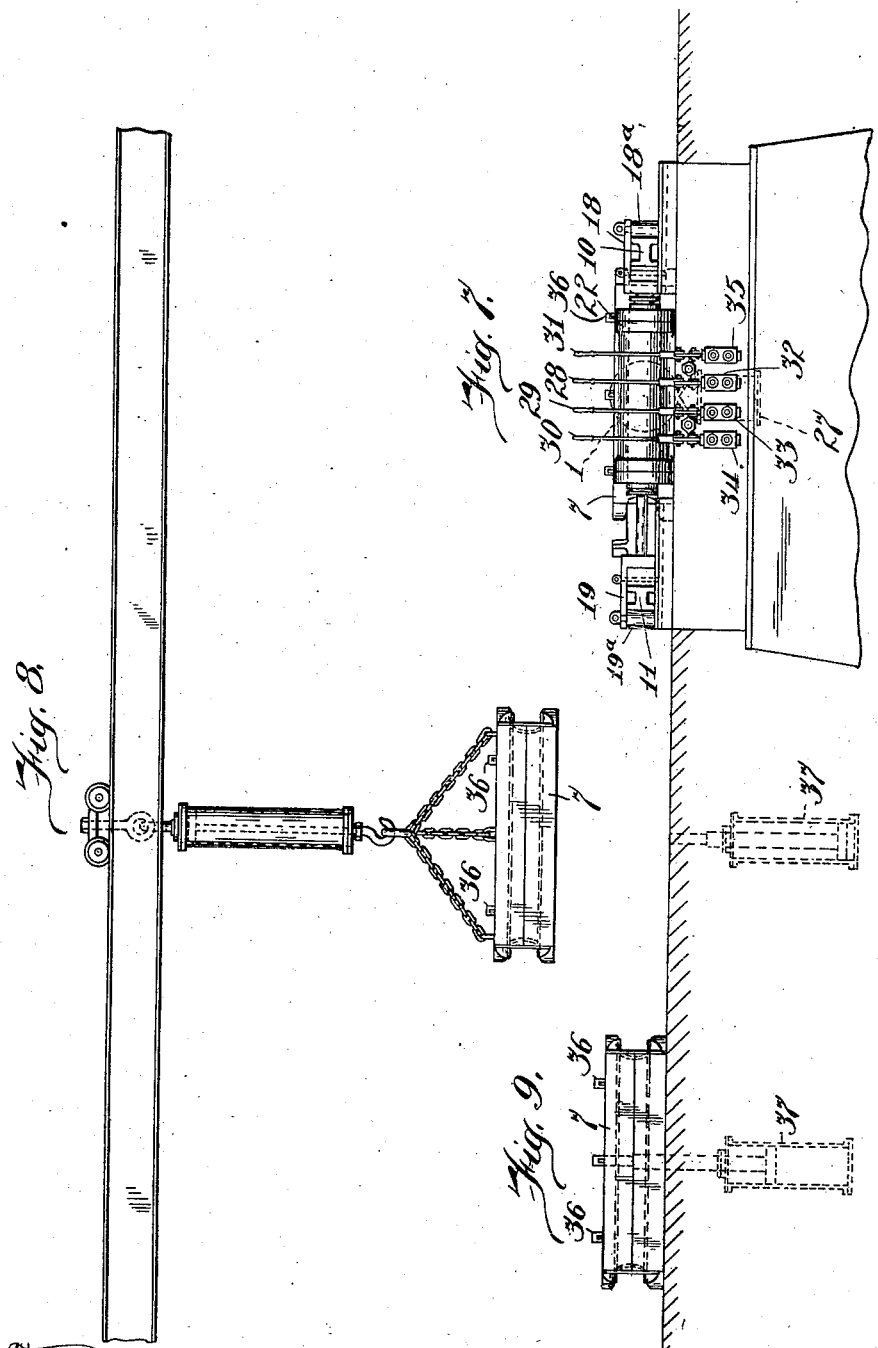

H. W. JACOBS.
FLANGING PRESS.
APPLICATION FILED MAY 31, 1910.

972,195.

Patented Oct. 11, 1910.
5 SHEETS—SHEET 3.

Witnesses
Milton Lenoir
E. N. Kernwein

Inventor
Henry W. Jacobs
By Heidman & Street
Attorneys.

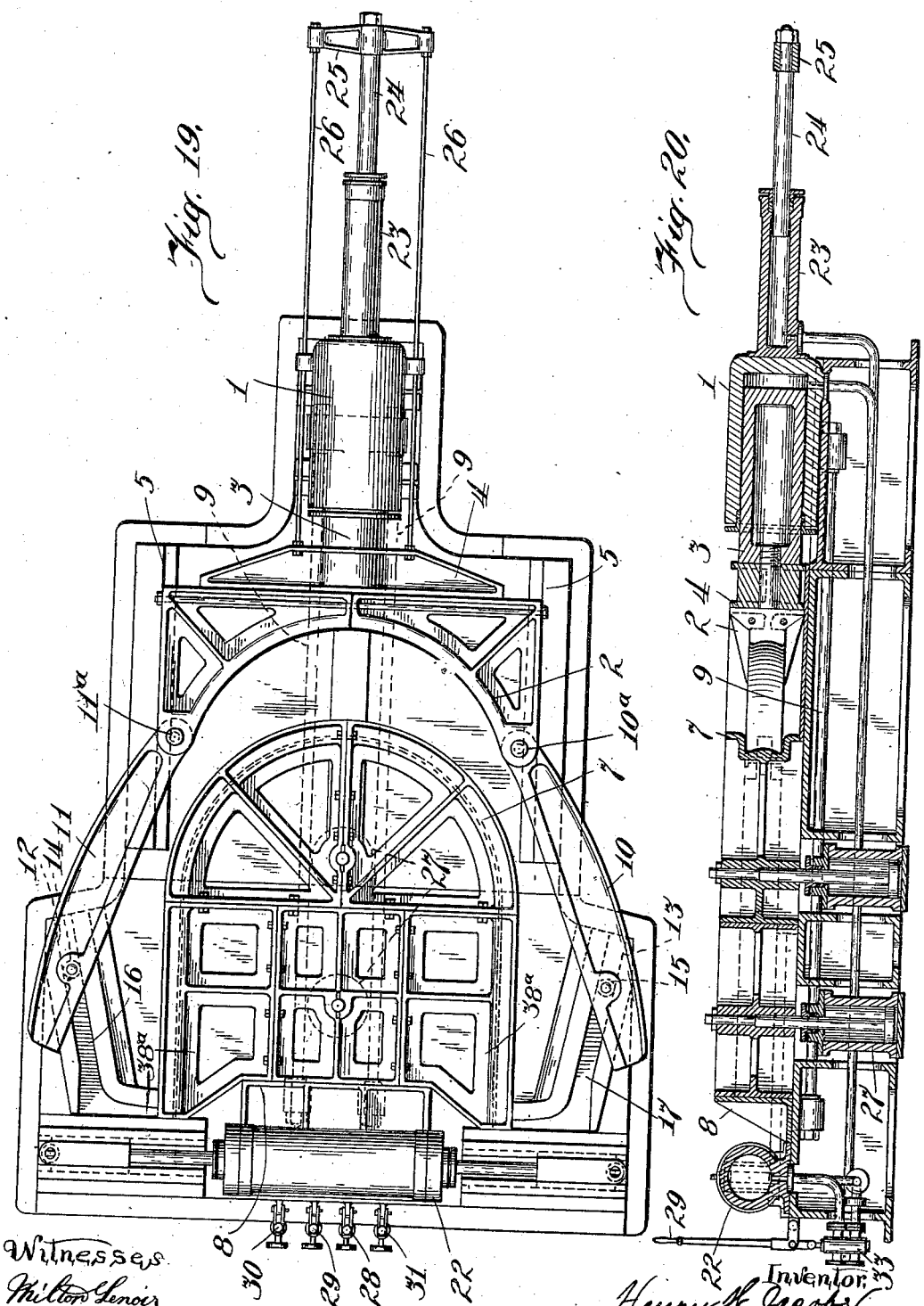

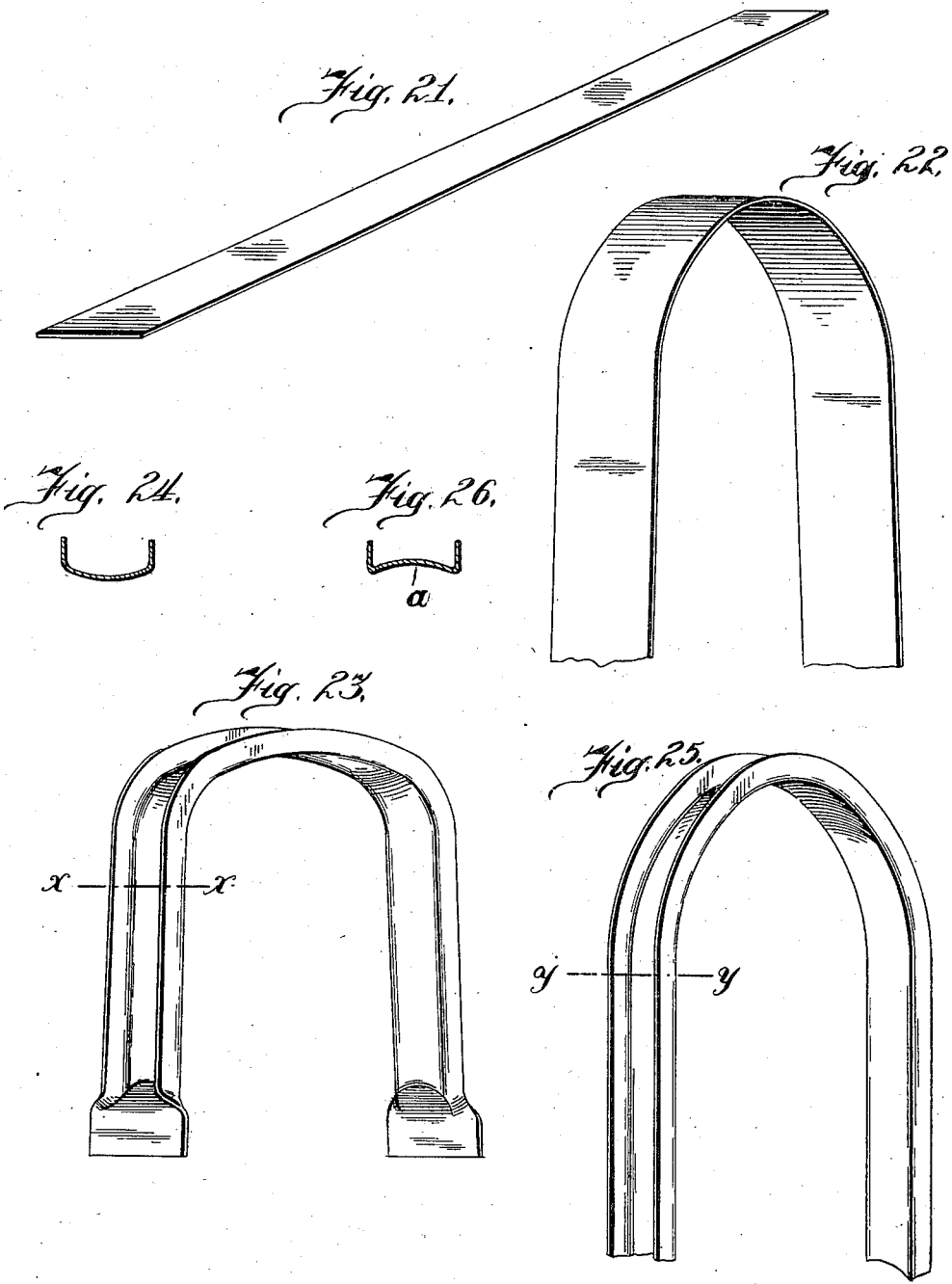

UNITED STATES PATENT OFFICE.

HENRY W. JACOBS, OF TOPEKA, KANSAS.

FLANGING-PRESS.

972,195.  Specification of Letters Patent.  Patented Oct. 11, 1910.

Application filed May 31, 1910. Serial No. 564,119.

*To all whom it may concern:*

Be it known that I, HENRY W. JACOBS, a citizen of the United States, and a resident of Topeka, county of Shawnee, and State of Kansas, have invented certain new and useful Improvements in Flanging-Presses, of which the following is a description, reference being had to the accompanying drawings, which form a part of my specification.

The object of my invention is to provide a flanging press,—which may be operated by any suitable motive power, preferably hydraulic,—which is adapted to press sheets of rolled steel into channel formed sections to be used in forming or building sectional fire-boxes and the like; the sheets having been previously cut to the desired size before being subjected to the operation of the press.

One object of my invention is to provide a press having sectional formers, each section of which may be separately operated and arranged to form channel sections with flattened ends so that they may be easily fitted to the mud-ring of the fire-box; the press being provided with means whereby the formers, used for making the channel formed sections, may be separated in such a manner that the sections may be readily removed from the formers after the operation of the press.

A further object of my invention is to provide adjustable means whereby the channel formed sections may be made with portions or legs of different lengths so that fire-boxes of different depths may be made with the same formers, thus permitting the construction of fire-boxes suitable for different kinds of fuel such as anthracite coal, bituminous coal, lignite, crude oils etc.

My invention also contemplates a press provided with formers having interchangeable parts whereby the channel formed sections of U-shape may be made with beveled ends and of different lengths suitable for producing fire-boxes with one end of the mud-ring lower than the other.

Figure 10:
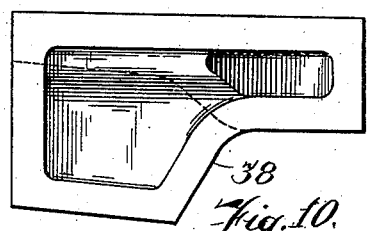
Figure 12:
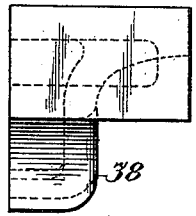
Figure 13:
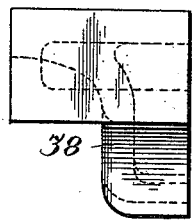
Figure 11:
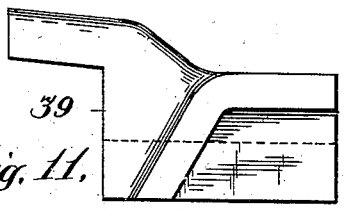
Figure 14:
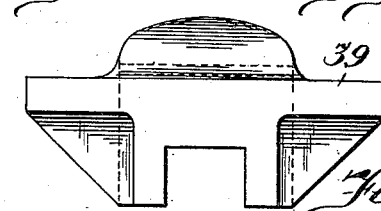
Figure 15:
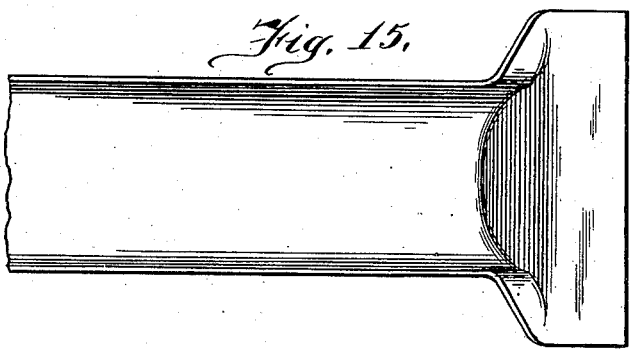
Figure 16:
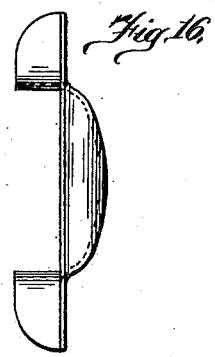
Figure 17:
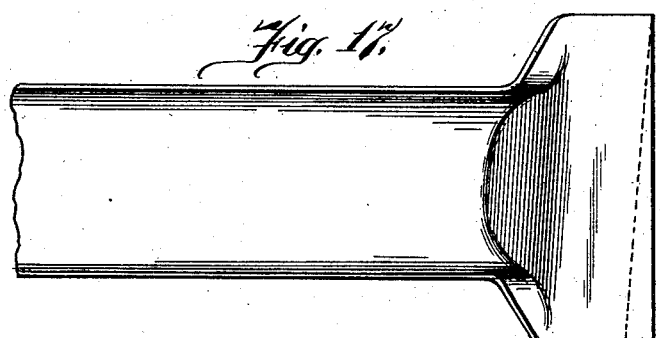
Figure 18:
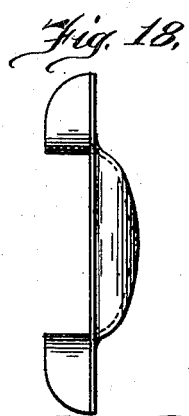

In the drawings: Figure 1 is a top plan view of my improved press provided with formers more especially adapted to form fire-box sections. Fig. 2 is a side elevation of the same. Fig. 3 is a plan view of the stationary member or former shown in Fig. 1. Fig. 4 is a side elevation of the former illustrated in Fig. 3, showing the same divided horizontally, the superimposed section or portion of the former being shown raised so that the channel formed U-shaped section may be readily removed. Fig. 5 is a plan view of a channel section formed by the press. Fig. 6 is a side elevation of the same. Fig. 7 is an end elevation of the press. Fig. 8 illustrates a traveling crane hoist with a stationary or male former being carried thereby. Fig. 9 illustrates a male former placed over a double acting cylinder whereby the sections of the former may be separated or brought together. Fig. 10 is a plan view of the removable portion or section of the male former; and Fig. 11 is a plan view of a removable portion or section of the female former. Fig. 12 is an end view of the one-half of the removable portion or section shown in Fig. 10; while Fig. 13 is an end view of the other half of said portion or section; these two views being taken from the right hand side of Fig. 10. Fig. 14 is an end view of the removable portion or section of the female former illustrated in Fig. 11 looking at the right end side of said figure. Fig. 15 is a side elevation of a portion of the channel section (looking at the concaved side), showing the flattened or flared end, resulting when formers like those shown in Figs. 1—3—4—10 and 11 are employed. Fig. 16 is an end view of the channel formed section shown in Fig. 15. Fig. 17 is a similar view to Fig. 15, but of a modified form of channel formed section; while Fig. 18 is an end view of the same. Fig. 19 is a top plan view of my improved press provided with formers which differ from those illustrated in Fig. 1; the formers illustrated in this figure being adapted to form the outside or shell sections. Fig. 20 is a longitudinal central sectional view of Fig. 19. Fig. 21 is a perspective view of a sheet properly cut and out of which the channel fire-box or shell sections are formed. Fig. 22 is a perspective view of the sheet bowed or bent so that it may be inserted in the press between the formers. Fig. 23 is a perspective view of the sheet pressed into channel form when the formers shown in Figs. 1—3—10 and 11 are employed—(channel also being shown in Fig. 6)—to constitute one of the fire-box sections. Fig. 24 is a cross sectional view taken on the line $x$—$x$, of Fig. 23. Fig. 25 is a perspective view of a shell section produced by the action of the formers shown in the press in Fig. 19. Fig. 26 is a cross sectional view taken on the line y—y, of Fig. 25.

My invention consists of a flanging press, preferably of the horizontal type illustrated, mounted on a suitable base as shown in Figs. 2 and 20, and it comprises male or stationary former and female or movable formers which are designed to form channel sections of suitable shape to constitute the fire-box and shell of a fire-box of a locomotive type; the formers being preferably made up of several parts or sections, thus permitting different styles of channel-sections being formed on the same press.

The formers illustrated in the accompanying drawings for shaping the fire-box sections are especially intended to form sections for the Jacobs-Shupert type of sectional fire-box; the formers for producing the shell sections for this type of fire-box are made to fit the press.

The press consists of a number of hydraulic cylinders so arranged that pressure is made to bear on the formers in different directions in order that the necessary pressure may be obtained in the right direction and in such manner as not to rupture the metal. At one end of the press a large cylinder 1, preferably of the hydraulic type, is connected to that portion of the movable former 2, shown in Fig. 1 which produces the crown part of the fire-box section. The connection between the cylinder and portion of the former 2 is made through the plunger 3, which is in turn connected to the filling blocks 4 and 4ª removably secured to the former 2. These blocks are preferably bolted together and also bolted to the crown portion forming part of the movable former. This part of the former may be supported and held in proper alinement by guides 5, 5, in which the guide blocks 6, 6, secured to the sides of the movable former, slide. A stationarily held former 7, which is shown assembled in Fig. 3, as well as in Fig. 1, is properly placed in the press and held in place by a bracket 8, see Fig. 1; this bracket holds the former 7 against longitudinal movement away from the former 2 during operation of the press while the male former 2 is being forced against the former 7 by the plunger 3 of cylinder 1. The bracket or back stop 8 is held in place by the tie rods 9, 9, which are secured to the cylinder 1, see Figs. 1 and 2.

It is apparent from the construction shown that the crown portion of the former 2 will be made to operate with the crown portion of the other former as soon as plunger 3 is operated. Secured to the sides of the crown portion of the movable former are the wing portions or sections 10 and 11 which are pivoted to the crown portion as indicated at 10ª and 11ª. The wings 10 and 11 are guided in their movement by guide blocks 12 and 13 arranged in the frame of the press at either side, see Fig. 1; the wings being provided with rollers 14 and 15 which engage in the slots 16 and 17 of the guide blocks 12 and 13. As the plunger 3 forces the movable former onto the other or stationary former the direction of the slots 16 and 17 will compel the wing portions or sections 10 and 11 to gradually take against the sides of the stationary former, and the free ends of the wings 10 and 11 will be forced through yokes 18 and 19, which are secured on the pistons 20 and 21, both of which pistons work in the cylinder 22. When the pistons 20 and 21 are drawn inward, the yokes 18 and 19 will pull the free ends of the wings 10 and 11 against the sides of the stationary former; this movement of the wings being made possible by the direction of the lower end of the slots 16 and 17 toward the center of the press, see Fig. 1. By employing the rollers 14 and 15 the friction at this point is of course greatly reduced; and in order to overcome the frictional contact between the free ends of the wings and the yokes, I provide the yokes with the rollers 18ª and 19ª, see Figs. 1 and 7. In Fig. 1 I have shown the movable former brought against and onto the former 7 with wing 11 in contact with bracket 19 just prior to the operation of piston 21 whereby the wing 11 is drawn against the side of the former 7; while wing 10 is shown drawn against the side of the stationary former in its final position.

In the operation of the press both wings are approximately brought against the sides of the stationary former at the same time; the operation of the sections or wings 10 and 11 following that of the crown portion, so that the metal is gradually forced into shape, thus preventing any rupturing of the metal which might otherwise occur. After the movable former has thus been closed or brought about the other former and the channel formed, the wings 10 and 11 are pushed outward by pistons 20 and 21 when the entire movable former is drawn away from the stationary former by means of the steeple or auxiliary cylinder 23 which is shown attached to the head of the pressure cylinder 1, see Figs. 1, 2, 19 and 20. This operation or movement of the movable former mechanism is brought about by the action of the releasing cylinder plunger 24 to which is secured a yoke 25. The yoke 25 is secured to the filling block 4 of the crown portion of the movable former by tie rods 26. In order to release the formed section which has been acted upon by the formers of the press, and which of course remains in contact with the stationary former 7, I prefer to divide the stationary former horizontally into an upper and a lower portion, adapted to be separated in the manner shown in Fig. 4. This separation is accomplished by the action of the double acting cylinders 27, see Fig. 2, which are preferably secured or embedded in the base of the press. The cylinders are operatively connected with the upper half of the stationary former so that said half will be moved upward, thereby releasing the formed sections which may now be lifted up and removed in any suitable manner.

I have arranged the levers for the valves that control the different cylinders, at the base of the press where the operator may control the operation of the entire press. The lever 28 governs a double acting valve 32, see Fig. 7, which operates the main cylinder 1; while lever 29 governs a double acting valve 33, see Fig. 7, which operates the releasing cylinder 23. If desired, these two valves may of course be combined, forming a quadruple acting valve. A lever 30 governs a quadruple acting valve 34, see Fig. 7, which valve operates pistons 20 and 21 in the cylinder 22. This part of the press could be constructed with a cylinder to the outside of both wings 10 and 11 so that the pistons would push the wings instead of pulling them inward as in the construction shown; but I prefer the construction illustrated and described because a more compact construction is thereby had. A lever 31 controls the quadruple acting valve 35, see Fig. 7, which valve operates the cylinders 27 mounted in the base of the press, through whose action the two portions or halves of the stationary former are separated as previously described.

The successive operations of the press in forming a section are as follows: The movable former is of course drawn away from the stationary former as far as possible whereby the wings 10 and 11 will be spread through the action of guides 12 and 13, as illustrated in Fig. 19, while the two portions or halves of the stationary former are held tightly together and in place by the downward action of the pistons in the cylinders 27. A flat sheet of rolled steel, as illustrated in Fig. 21, is then taken and previously bent into U-shape, as illustrated in Fig. 22, and preferably heated to a cherry red (although the section could be formed while the sheet is cold if desired). The bowed or U-shaped sheet is then laid around the outside of the former 7 and held in the proper position by stop blocks of any suitable construction. The main pressure cylinder 1 is then operated through valve 32 by the operation of lever 28, and this will force plunger 3 to move the former 2 against the crown of the former 7, thereby forming the crown portion of the channel shaped section. This part of the two formers will act on the sheet of steel to a point slightly beyond the pivotal points 10$^a$ and 11$^a$ and form a crown intermediate of the hinges 10$^a$ and 11$^a$. While the crown portion of the formers have been brought together as described, the guides 12 and 13 will be forcing the wings 10 and 11 toward the stationary former, and thereby bring the free ends of the wings into the yokes 18 and 19. The lever 30 is then operated which controls valve 34 so that the pistons 20 and 21 in the cylinder 22 are drawn inward, which will bring the wings 10 and 11 against the sides of the former 7 into the position shown by wing 10 in Fig. 1. The entire channel section will now have been formed through the action of the coöperating sections or parts of the two formers, and the press may now be left set in this closed position until the formed section cools, after which the wings 10 and 11 are pushed outward by pistons 20 and 21 in cylinder 22; the pistons forcing the wings or sections outward until the latter take the position shown by wing 11 in Fig. 1, when the entire movable former mechanism may be drawn away from the former 7 by means of the releasing cylinder 23 which is operated through the valve 33 controlled by lever 29 until the movable former and its pivoted sections reach the initial position shown in Fig. 19. The stationary former may now be parted through its horizontal center as previously described, and as shown in Fig. 4, with the top half raised through the action of the pistons in the cylinders 27, which are controlled by the operation of valve 35 which in turn is controlled by lever 31. The formed section can now be lifted up and drawn out of the press; the nature or form of the completed section being illustrated in Figs. 5, 6 and 23.

I have shown the lower portion of the stationary former provided with pins 36, which pass through holes 36$^a$ in the upper portion of the former; the ends of which are provided with holes or slots through which suitable cotter keys may be driven in order to clamp the two halves of the stationary former tightly together. The purpose in providing the stationary former with these pins 36 is to permit the entire stationary former to be lifted off of the press with the formed section still in place after the former and pistons of cylinders 27 have been disconnected. The section may thus remain in the stationary former until it is thoroughly cooled before removing it. I have shown in Fig. 8 a traveling crane or hoisting mechanism whereby the former 7 may be carried to a suitable point, as for example on the floor in which may be embedded cylinders 37; the former may be so placed that the pistons of these cylinders will force the upper half of the stationary former away from the lower half, as indicated in Fig. 4. In order to permit the upper half being lifted, it is of course necessary to at first remove the cotter keys from the pins 36; after the two halves of the stationary former have thus been separated, the cooled formed section may then be removed. By constructing the stationary former in the manner just described it is possible to allow the section to remain intact with the stationary former until it has thoroughly cooled; and a new set of stationary formers may be placed in the press so that the operation of the press may be continued.

It will of course be understood that the contour of the formers may be altered to produce sections of the desired shape; and in order that different lengths of legs or differently formed ends may be formed on the sections, the corner sections or parts 38 of the stationary former are removably secured so that they may be replaced by a different style or type. For the same reason the end portions or sections 39 of the movable former are removably secured to the wings 10 and 11; the parts 39 being the portion of the wings that coöperate with the corner parts or sections 38 of the stationary former. The corner parts or portions 38 and 39 connected to the movable and stationary formers, illustrated in Fig. 1, are more clearly shown in Figs. 10, 11, 12, 13 and 14. When these portions 38 and 39 are used, the ends of the channel sections will be formed as illustrated in Figs. 5, 6, 15, 16 and 23; these sections being adapted to form a fire-box provided with a level mud-ring. In a fire-box provided with a sloping mud-ring it is necessary to form the sections as shown in Figs. 17 and 18 with the bevel ends, the channels also being dished or flared at an angle as shown in Fig. 17. By varying the length of the changeable sections 38 and 39 of the two formers, the length or size of the channel formed sections may be either increased or diminished in order to produce a construction of fire-box adapted for different kinds of fuel.

When it is desired to use the press to form the shell sections shown in Fig. 25, the crown portions of the formers are changed to produce a section, as shown in Fig. 25, with the upper part forming an arc of a circle, instead of the dome portion as shown in Fig. 23. In Fig. 19 the press is shown provided with formers adapted to produce this type of section. As the shell section must necessarily be larger than the fire-box section, the arches of the formers are of course larger; therefore the filling blocks 4$^a$, shown in Fig. 1, may be omitted; and the guide blocks 6, 6, secured to the movable former, as shown in Fig. 1, are also unnecessary because the movable former in this construction being larger, it takes into the guides or slots 5, 5. As the ends of the shell sections are not to be dished and flared, as are those of the fire-box sections, the portions 38 of the stationary former and 39 of the movable former are not employed, but a section 38$^a$ of different contour, see Fig. 19, is inserted in place of the section 38. As the two formers are made up in sections which are bolted together, it is apparent that any one or all of the sections may be readily removed or replaced by a section or sections of different contour in order to produce a shell or formed section of the desired shape; the press in Fig. 19 being shown with formers adapted to produce a different shaped section in cross-section, see Fig. 26. When formers intended to produce a shell section of the character just mentioned and shown in Figs. 25 and 26 are used, the stationary former is not divided horizontally into halves as previously described, because they could not be separated after the shell-section is formed and still in place by reason of the bowing of the body-portion of the section intermediate of the side flanges, see Fig. 26, at $a$. When a section or part of one former is changed it is, of course, understood that the corresponding part or section of the other former must be changed so that the respective parts of the two formers will properly coöperate.

With my improved press it is apparent that a thorough pressure is immediately applied at the crown or arch portion, while a gradual application of pressure at the sides in the direction of the ends of the sections is had, thus preventing any rupturing of the metal while it is being flanged and the ends cupped or dished in the manner shown in the drawings. Furthermore with my invention, pressure on the various parts of the formers can not only be applied at different times, but the pressure is applied at the proper point to give the best results.

It is of course understood that the formers may be altered to produce formed sections of any desired shape, and other alterations may be made in a number of minor details without departing from the spirit of my invention, and I do not wish to be understood as limiting myself to the exact construction shown and described, but What I wish to secure by Letters Patent is:—

1. A press of the class described, comprising a pair of formers, one of said formers being movably mounted and consisting of a number of sections, independent means whereby the different sections of the movable former will be guided in their movements toward the other former, and separate means operatively connected with the different sections of the movable former whereby independent coöperation of the sections with the other former and pressure on the respective sections is obtained.

2. In a press of the class described, for forming sections of U-shaped or equivalent form, the combination of a pair of formers, one of which is movable and composed of a crown or arch section and side or wing sections pivotally secured together, the other or stationary former being divided through its horizontal axis, with separate mechanism operatively connected with the respective sections of the movable former whereby the sections are successively made to coöperate with the other or stationary former and independent pressure applied thereto, and means located beneath the stationary former and operatively connected with the upper section or part thereof whereby the two parts of said formed may be separated.

3. A press of the class described, comprising a movable former and a stationary former, the movable former being composed of a crown or arch section and side or end sections, means whereby the different sections will be guided in their movements and the ends of the side sections adjacent to the crown or arch section made to coöperate with the stationary former in advance of the other ends thereof, a power-operated device controllingly connected with each of said sections whereby independent pressure is applied to the respective sections, and a power-operated device whereby the formers are separated.

4. A press of the class described comprising a pair of formers, one of said formers being made in sections, means for separately controlling the different sections, and independent mechanism whereby the respective sections of the one former are guided toward the other former, the relation between the two formers being such that the sections intermediate of the end sections will coöperate with the other former in advance of the end sections and the ends of the end-sections adjacent to the intermediate sections made to coöperate with the other former in advance of their opposite ends.

5. A press of the class described comprising a pair of formers, the one former being composed of pivotally connected sections, pressure mechanism operatively connected with the intermediate section of said former whereby it is independently made to coöperate with the other former, and pressure mechanism slidingly connected with the ends of the end sections of the first mentioned former whereby the free ends of said sections are moved into or out of coöperative relation with the other or second mentioned former.

6. In a press of the class described, the combination of a pair of composite formers, the parts or members of the one or stationary former being removably secured together, while the parts or members of the other or movable former are pivotally connected together so as to form intermediate or crown and side or wing sections, means operatively connected with the free ends of the wing sections whereby the ends of said wings are independently guided in their movements, with pressure-applying mechanism operatively connected with the intermediate portion of said movable former, and pressure applying mechanism operatively connected with the wing or side sections of said former, whereby pressure is separately applied to the respective sections and the latter independently operated.

7. In a press of the class described, a stationary formed divided through its horizontal axis, pressure operated mechanism located beneath said former and operatively connected with the upper portions or half thereof whereby said portions may be separated, and means whereby the operation of said mechanism may be controlled.

8. In a press of the class described, the combination of a movable and a stationary former, the stationary former being divided through its horizontal axis, with means located beneath said stationary former and operatively connected with the upper portion or half thereof whereby the latter may be forced upward, and means whereby the two portions or halves may be clamped together.

9. In a press of the class described, the combination of a movable and a stationary former, the stationary former being divided into two portions or halves, with one or more double acting cylinders operatively connected with one of said portions or halves and adapted to hold the two portions of the said former together when acting in one direction and to force said portions of the former apart when acting in the opposite direction.

10. In a press of the class described, for forming channel sections of U-shaped or equivalent form, the combination with a male former and a female former, the one former being composed of intermediate and side or wing sections pivotally secured together, with pressure cylinders operatively connected with the intermediate section and with said side sections of said former, the cylinders connected with the side or wing sections being double-acting so as to force said sections toward or away from the other former.

11. In a press of the class described, a pair of formers adapted to form channel sections of U-shape or equivalent form, one of said formers being arranged to move horizontally and composed of intermediate and side or wing sections all of which are pivotally connected together, means for forcing the intermediate section or portion of said former against the other former in advance of the side or wing sections or portions of said first former, mechanism with which the free ends of said wing sections become engaged during the operation of said intermediate sections, and means whereby said mechanism is operated and the ends of said wing sections made to coöperate with the other or second former.

12. A press of the class described comprising a pair of formers, one of which is arranged to move horizontally toward the other former, said movable former being provided with two hinged sections or wings, a cylinder operatively connected with the body portion of said movable former and adapted to force it toward the other former, a second cylinder operatively connected with both of said wings and adapted to move said wings toward or away from the second former, and a third cylinder arranged to draw the movable former away from the second former.

13. A press of the class described comprising a pair of formers, one of the formers being composed of a number of sections pivotally connected together, separate and independently operated means for forcing the various sections toward the other former, and mechanism providing anti-friction bearings for the free ends of two of the sections and operatively connecting the sections with one of said means.

14. In a press of the class described, a pair of formers, one of said formers being composed of a number of sections pivotally connected together, a pair of hydraulic cylinders arranged to apply direct pressure on the different sections, and a pair of yokes whereby the free ends of two of the sections are operatively connected with one of said cylinders.

15. In a press of the class described, a stationarily held former and a movable former, the movable former being composed of an intermediate section and two end sections all of which are pivotally connected together, hydraulic cylinders arranged to apply direct pressure on the respective sections, and means whereby the free ends to the end sections are slidably connected with said cylinders.

16. In a press for forming channel sections of substantially U-shape or equivalent form, the combination of a pair of formers, one of which is movable and composed of several sections pivotally connected together, means for forcing the movable to and from the stationary former, and separate guides operatively engaging the pivoted sections whereby first the pivoted, then their free ends are pressed into coöperative relation with the stationary former.

HENRY W. JACOBS.

Witnesses:
E. N. KERNWEIN,
GEORGE HEIDMAN.